(12) United States Patent
Hornbostel et al.

(10) Patent No.: US 10,209,386 B2
(45) Date of Patent: Feb. 19, 2019

(54) PROCESSING METHODS FOR TIME DIVISION CSEM DATA

(71) Applicants: Scott C. Hornbostel, Houston, TX (US); Shangli Ou, Sugar Land, TX (US)

(72) Inventors: Scott C. Hornbostel, Houston, TX (US); Shangli Ou, Sugar Land, TX (US)

(73) Assignee: ExxonMobil Upstream Research Company, Spring, TX (US)

(*) Notice: Subject to any disclaimer, the term of this patent is extended or adjusted under 35 U.S.C. 154(b) by 817 days.

(21) Appl. No.: 14/404,204

(22) PCT Filed: Jun. 27, 2013

(86) PCT No.: PCT/US2013/048304
§ 371 (c)(1),
(2) Date: Nov. 26, 2014

(87) PCT Pub. No.: WO2014/035543
PCT Pub. Date: Mar. 6, 2014

(65) Prior Publication Data
US 2015/0160363 A1    Jun. 11, 2015

Related U.S. Application Data

(60) Provisional application No. 61/695,202, filed on Aug. 30, 2012.

(51) Int. Cl.
*G01V 3/12* (2006.01)
*G01V 3/08* (2006.01)
(Continued)

(52) U.S. Cl.
CPC .................. *G01V 3/12* (2013.01); *G01V 3/02* (2013.01); *G01V 3/083* (2013.01); *G01V 3/38* (2013.01); *G01V 2003/086* (2013.01)

(58) Field of Classification Search
CPC .... G01V 3/083; G01V 2003/086; G01V 3/38; G01V 3/12; G01V 3/02
See application file for complete search history.

(56) References Cited

U.S. PATENT DOCUMENTS 6,739,165 B1    5/2004    Strack
6,859,038 B2    2/2005    Ellingsrud et al.
(Continued)

OTHER PUBLICATIONS

Chave A.D. et al. (1991), "Electrical Exploration Methods for the Seafloor," Chapter 12, *Electromagnetic Methods in Applied Geophysics* 2, pp. 931-966.
(Continued)

*Primary Examiner* — Mischita L Henson
(74) *Attorney, Agent, or Firm* — ExxonMobil Upstream Research Company—Law Department

(57) ABSTRACT

Method for inverting, in the frequency domain (42), controlled source electromagnetic survey data (41) acquired using a time-division compound waveform made up of sub-sequences of different base waveforms, for example square waves of different frequencies. A windowed Fourier decomposition method is used, with the window size and shape designed in consideration of the sub-sequences. The window length may be twice the length of the compound waveform, or more. Alternatively the window length may be comparable to the sub-sequence length, or slightly less. Window shapes include $\cos^2$, rectangular, and triangular. The method addresses the problem of unknown arrival times for each sub-sequence, and also transition transients that occur between sub-sequences.

17 Claims, 4 Drawing Sheets

(51) Int. Cl.
*G01V 3/02* (2006.01)
*G01V 3/38* (2006.01)

(56) References Cited

U.S. PATENT DOCUMENTS

| | | | |
|---|---|---|---|
| 6,950,747 B2 | 9/2005 | Byerly | |
| 6,999,880 B2 | 2/2006 | Lee | |
| 7,145,341 B2 | 12/2006 | Ellingsrud et al. | |
| 7,187,569 B2 | 3/2007 | Sinha et al. | |
| 7,191,063 B2 | 3/2007 | Tompkins | |
| 7,356,412 B2 | 4/2008 | Tompkins | |
| 7,362,012 B2 | 4/2008 | Godkin | |
| 7,502,690 B2* | 3/2009 | Thomsen | G01V 3/083 367/21 |
| 7,536,262 B2 | 5/2009 | Hornbostel et al. | |
| 7,542,851 B2 | 6/2009 | Tompkins | |
| 7,659,721 B2 | 2/2010 | MacGregor et al. | |
| 7,667,464 B2 | 2/2010 | Campbell | |
| 7,683,625 B2 | 3/2010 | Milne et al. | |
| 8,008,920 B2 | 8/2011 | Lu et al. | |
| 8,099,239 B2 | 1/2012 | MacGregor et al. | |
| 8,185,318 B2 | 5/2012 | Alam et al. | |
| 8,482,287 B2 | 7/2013 | Tompkins | |
| 2006/0186887 A1 | 8/2006 | Strack et al. | |
| 2009/0005997 A1* | 1/2009 | Willen | G01V 3/12 702/13 |
| 2009/0134877 A1 | 5/2009 | Schaug-Pettersen | |
| 2009/0204330 A1 | 8/2009 | Thomsen et al. | |
| 2009/0243613 A1* | 10/2009 | Lu | G01V 3/083 324/323 |
| 2009/0306900 A1 | 12/2009 | Jing et al. | |
| 2009/0309599 A1 | 12/2009 | Ziolkowski | |
| 2010/0179761 A1 | 7/2010 | Burtz et al. | |
| 2010/0224362 A1* | 9/2010 | Carazzone | G01V 3/083 166/250.15 |
| 2012/0090834 A1 | 4/2012 | Imhof et al. | |

OTHER PUBLICATIONS

Constable, et al. (1996), "Marine controlled-source electromagnetic sounding 2. The PEGASUS experiment," *Journal of Geophysical Research* 101 (B3), pp. 5519-5530.

Eidesmo, T. et al. (2002), "Sea Bed Logging (SBL), a new method for remote and direct identification of hydrocarbon filled layers in deepwater areas," *First Break* 20.3, pp. 144-152.

Ellingsrud, S. et al. (2002), "Remote sensing of hydrocarbon layers by seabed logging (SBL): Results from cruise offshore Angola," *The Leading Edge*, pp. 972-982.

MacGregor, L. et al. (2001), "Electrical resistivity structure of the Valu Fa Ridge, Lau Basin, from marine controlled-source electromagnetic sounding," *Geophys. J. Int.* 146, pp. 217-236.

* cited by examiner

PROCESSING METHODS FOR TIME DIVISION CSEM DATA

CROSS-REFERENCE TO RELATED APPLICATION

This application is the National Stage entry under 35 U.S.C. 371 of PCT/US2013/048304 that published as WO 2015/035543 and was filed on 27 Jun. 2013, which claims the benefit of U.S. Provisional Application No. 61/695,202, filed on 30 Aug. 2012, each of which is incorporated by reference, in its entirety, for all purposes.

FIELD OF THE INVENTION

This disclosure relates generally to the field of geophysical prospecting and, more particularly, to electromagnetic surveys. Specifically, the disclosure relates to the field of controlled-source electromagnetic surveys for geophysical applications.

BACKGROUND OF THE INVENTION

Controlled-source electromagnetic ("CSEM") geophysical surveys use active (man-made) sources to generate electromagnetic fields to excite the earth, and deploy receiver instruments on the earth's surface, the seafloor, or inside boreholes to measure the resulting electric and magnetic fields, i.e., the earth's response to the source excitation. FIG. 1 illustrates the basic elements of an offshore CSEM survey. A vessel tows a submerged CSEM transmitter 11 over an area of sub-sea floor 13. The electric and magnetic fields measured by receivers 12 are then analyzed to determine the electrical resistivity of the earth structures (subsurface formations) beneath the surface or seafloor.

CSEM surveys are an important geophysical tool for evaluating the presence of hydrocarbon-bearing strata within the earth. These surveys typically record the electromagnetic signal induced in the earth by a source (transmitter) and measured at one or more receivers. The behavior of this signal as a function of transmitter location, frequency, and separation (offset) between transmitter and receiver can be diagnostic of rock properties associated with the presence or absence of hydrocarbons. A notable diagnostic rock property of this kind is electrical resistivity. Thus, CSEM measurements are typically used to determine the spatially-varying resistivity of the subsurface.

As can be appreciated, this technology has been applied for onshore mineral exploration, oceanic tectonic studies, and offshore petroleum and mineral resource exploration. For example, as noted above, the controlled-source electromagnetic ("CSEM") geophysical survey may be performed on vehicles in a land-based system, in the vessels in water-based systems and/or by aircraft by air-based devices, which are further discussed in various documents. See, for example, Chave et al., *Electromagnetic Methods in Applied Geophysics* (ed. M. N. Nabighian) 2, 931-966, Society of Exploration Geophysicists (1991); Constable and Cox, *J. Geophs. Res.*, Vol. 101, 5519-5530 (1996); MacGregor et al., *Geophy. J. Int.* 146, 217-236 (2001); S. Ellingsrud et al., *The Leading Edge*, 972-982 (2002); Eidesmo et al., *First Break* 20.3, 144-152 (2002).

The electromagnetic ("EM") fields generated by the transmitter may be created by injecting the currents into the earth or seawater/seafloor or by oscillating the currents in closed-loop wire, in either case, using a chosen periodic or transient waveform. The shape of the transmitted waveform determines its frequency spectrum. That is, the transmitter, through its waveform, controls the frequency content, frequency distribution and amplitude at each frequency for the transmitted waveform. These measured electric and magnetic fields are then analyzed to determine the electrical resistivity of the earth structures beneath the earth's surface or seafloor.

One type of transmitter waveform is the time division source waveform, which is a compound waveform formed by alternating two or more base waveforms, each chosen primarily for its different fundamental frequency so as to collectively provide the desired range of frequencies. Typically, each base waveform is repeated N times, which is called herein a sub-sequence of the compound waveform. FIG. 2 shows an example having six square-wave sub-sequences. This type of compound waveform is discussed in Patent Application Publication US 2008/008920, by Lu, Hornbostel, and Willen). The main advantages of time division waveforms are twofold: the frequency content can be specified with more flexibility; and the frequency components are localized in time leading to a possibly improved signal-to-noise ratio (SNR).

SUMMARY OF THE INVENTION

In one embodiment, the invention is a method for controlled-source electromagnetic prospecting comprising: (a) obtaining electromagnetic data acquired using repeated transmissions of a time-division source waveform, which is a compound waveform made by combining two or more sub-sequences of base waveforms having different primary or fundamental frequencies; (b) decomposing the data into frequency components using a windowed decomposition method involving Fourier transformation or a correlation-based equivalent or another method for isolating a single frequency component, said decomposition method being performed using a computer and being designed to deal with not knowing arrival times of particular sub-sequences in the time-division waveform; (c) imaging or otherwise interpreting the frequency components to determine a data volume of one or more earth properties; and (d) using this volume of earth properties for subsurface interpretation to assist in hydrocarbon exploration or production.

In some embodiments of the invention, the arrival time uncertainty is dealt with by using a small decomposition window, e.g. a time window with length comparable to the length of a single sub-sequence but less than the length of the entire time-division waveform. In other embodiments of the invention, the arrival time uncertainty is dealt with by using a larger decomposition window, e.g. a time window having a length and shape that are determined to ensure an equal number of appearances of each sub-sequence within the window.

BRIEF DESCRIPTION OF THE DRAWINGS

The present invention and its advantages will be better understood by referring to the following detailed description and the attached drawings in which.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

Figure 1:
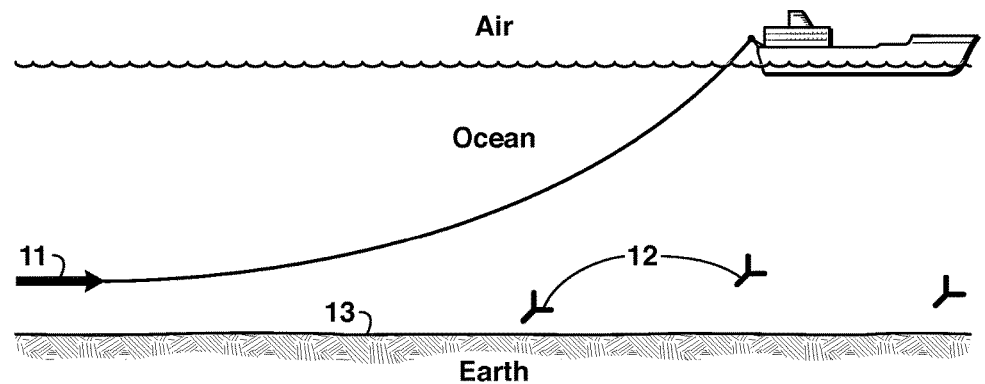
FIG. 1 is a diagram illustrating deployment of field equipment in conducting a typical CSEM survey in a marine environment.
Figure 2:
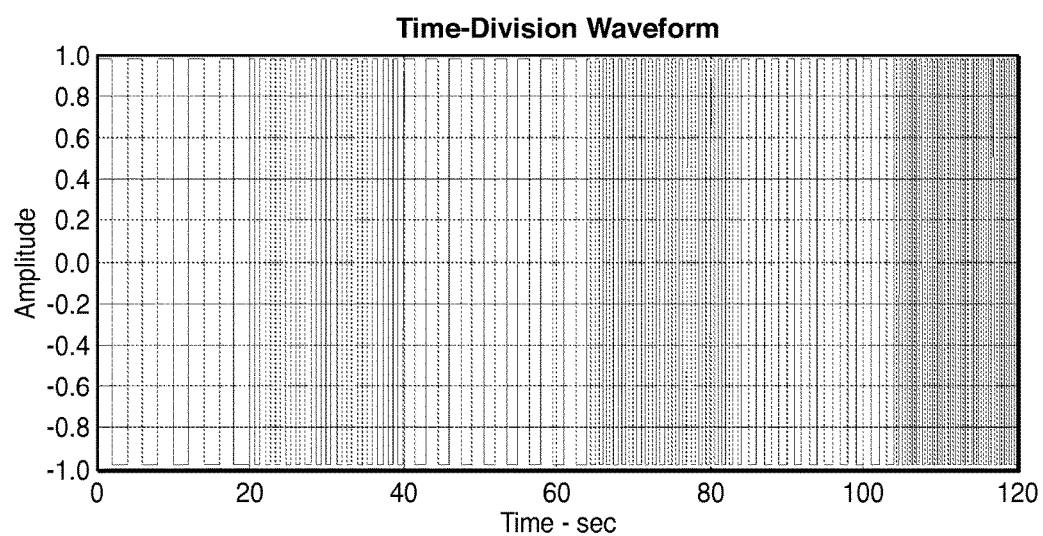
FIG. 2 shows a six-segment time-division waveform with square-wave subsequences having fundamental frequencies of 0.25 Hz, 0.75 Hz, 0.33 Hz, 1.00 Hz, 0.50 Hz, and 1.50 Hz.
Figure 3:
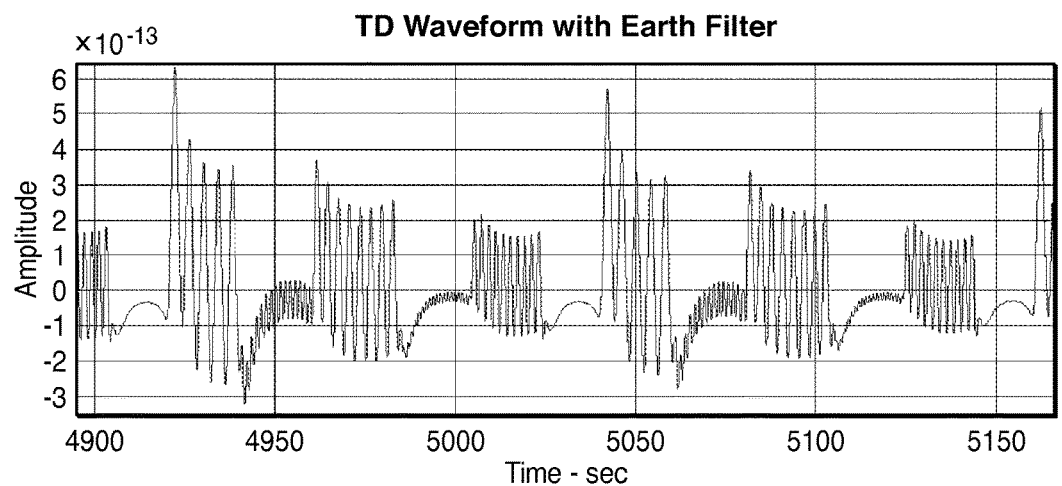
FIG. 3 shows the result of the waveform from FIG. 2 after simulated earth filtering (no added noise)

The time-localized nature of time-division waveforms leads to a major difficulty, one that is a discovery of the present invention. Processing these separate sub-sequences can be difficult because one may not know the arrival time of the package, meaning that it is impossible to separately window each sub-sequence in the compound waveform, and one m must also deal with transition effects between sub-sequences. Further complications include frequency dependent arrival times and overlapping effects from adjacent subsequences. An example of the earth filtering effects on the waveform of FIG. 2 is illustrated in FIG. 3. Residual low frequency effects (largely from the transition transients) are evident as is the large relative attenuation of the higher frequency subsequences. With field data, there would also be ambient noise that often obscures the signal.

Figure 4:
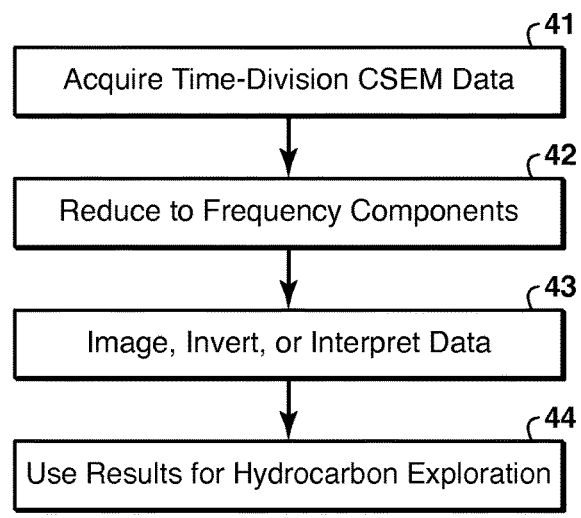
FIG. 4 is a flowchart showing basic steps in one embodiment of the present inventive method.

The present inventive method can be understood using the flowchart in FIG. 4. To begin with, at step 41, CSEM data are collected using a time-division waveform such as is illustrated in FIG. 2. The next step (step 42) is the critical reduction of the received data into the required frequency components using the methods described below. In all cases, the segmented nature of the waveform must be considered. The present inventive method provides two approaches that address segmented waveforms; they may be categorized as the large-window or small-window approaches, where the data are decomposed to the frequency domain, e.g. Fourier transformed, one window at a time. After reducing the data to its frequency components, the results are imaged, inverted, or interpreted at step 43 to obtain a resistivity image of the subsurface. This image is subsequently utilized (step 44) to assist in hydrocarbon exploration or production.

A critical portion of the invented method (FIG. 4) is the step (42) where the received data are reduced to their required frequency components. Next follows an explanation of the two ways for doing this that were referred to above.

Large-Window Approach

Figure 5:
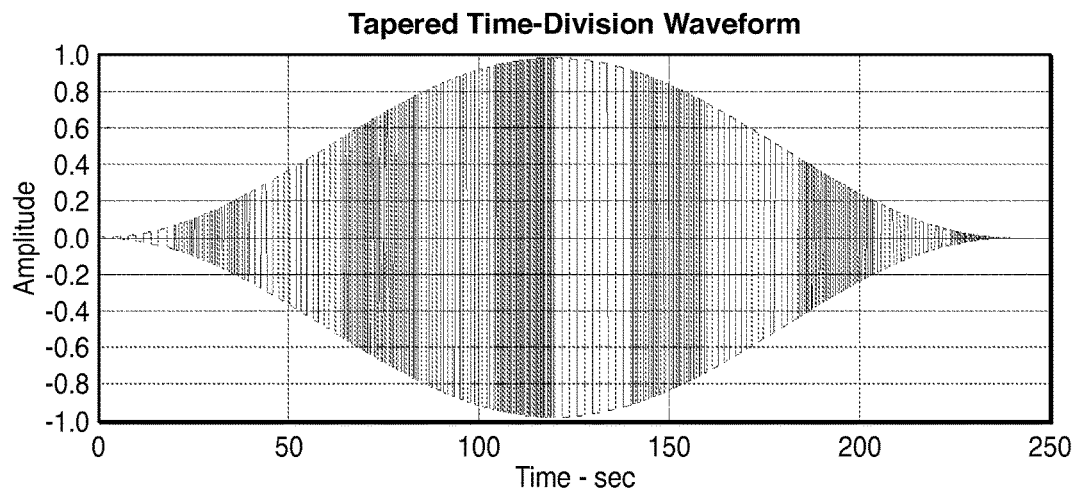
FIG. 5 shows a cosine squared window applied over two sequences of the waveform of FIG. 2.

One solution that attempts to address the unknown arrival-time problem uses special overlapping windows for spectral estimation. An example with a cosine-squared window is illustrated in FIG. 5. The window size and type is selected such that the frequency components of interest (for example, one might select the fundamental and the third harmonic of each of the six square-wave subsequences shown in FIG. 2) will have the same amplitude regardless of their arrival time within the window.

An example of a preferred window for this application has length of two times the sequence duration and amplitude of cosine squared or triangular type (FIG. 5 shows an example of the cosine-squared type). For this type of window, each sub-sequence will occur twice and the window amplitudes at these two occurrences will sum to unity. This is regardless of the sub-sequence position within the window. One is thus able to extract a frequency component of interest without having its arrival time.

The reason that this occurs can be understood by considering the phase of the cosine squared window for the two relevant arrivals. Because of the window size (i.e., twice sequence length) the two arrivals will have weights of $\sin^2\theta$ and $\cos^2\theta$, respectively, for some weighting-function with phase value of $\theta$. It is well known trigonometric identity that $\sin^2\theta+\cos^2\theta=1$ for all $\theta$. A similar argument can be made for the triangular window where the relative weights will be $\tau$ and $(1-\tau)$ for some scale factor $\tau$. The sum is again unity regardless of the arrival time (i.e., $\tau+(1-\tau)=1$).

This may be seen for the cosine squared window as follows. Without loss of generality, the weighting function (or taper) may be defined as $\cos^2(\pi/2(t/T-1))$ for t between 0 and 2T where T is the time duration of the full sequence. Assume that a particular portion of a subsequence (e.g., the onset) occurs at time $t_1$ where $t_1$ is between 0 and T seconds. The corresponding weight at $t_1$ is $wt_1=\cos^2(\pi/2(t_1/T-1))$. The next occurrence for that portion of a subsequence will occur at $t_2=t_1+T$ with corresponding weight at $t_2$ of $wt_2=\cos^2(\pi/2((t_1+T)/T-1))$ which is equivalent to $\cos^2(\pi/2(t_1/T-1)+\pi/2)$. This is the same as $\sin^2(\pi/2(t_1/T-1))$ since sine and cosine differ by a shift of $\pi/2$. Therefore $wt_1+wt_2=\cos^2(\pi/2(t_1/T-1))+\sin^2(\pi/2(t_1/T-1))=1$ because of the trigonometric identity.

It may be noted that it is generally better practice to taper or scale (the term weight may also be used) the time window of data to minimize edge effects as data move in or out of the window. With no taper, the spectral estimate has higher side lobes, which means a large frequency component can corrupt other frequency components. Since a time division signal will be structured in a particular way, the taper can be designed so that it does not impact the spectral estimation (step 42) regardless of where the sub-sequence falls in the window as described above (aside from some ripple described below).

The recovered amplitude and phase will be accurate as long as the underlying signal amplitude doesn't vary too much within the window duration. The triangular window has the added advantage that it will properly interpolate the frequency component as long as the underlying signal is approximately linearly varying in amplitude within the window.

Figure 6:
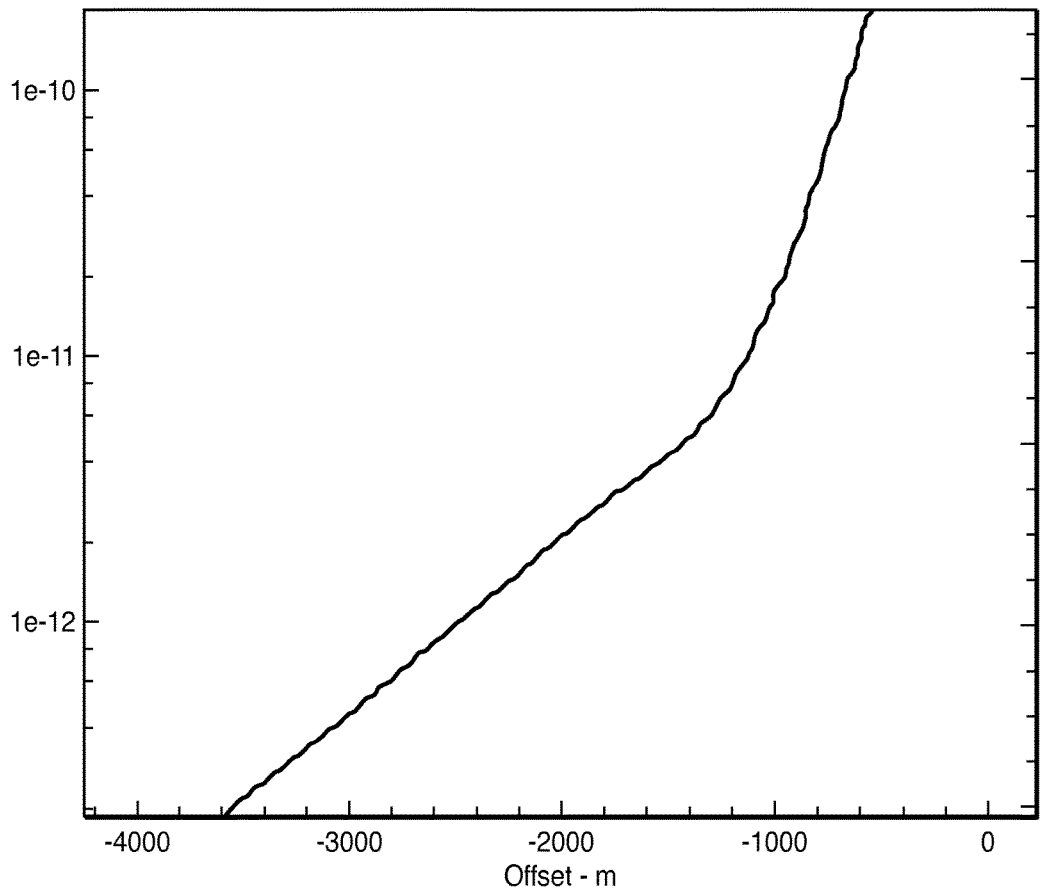
FIG. 6 shows an example of a recovered frequency component with ripple noise using the large-window approach of the present inventive method.

For some cases (e.g., high frequency and/or near offset) the underlying variation is clearly not linear and the resulting signal will contain some ripple noise in the processed result. The ripple is more pronounced when using a cosine-squared window (where error is introduced even with linearly varying amplitude within the window). An example illustrating this ripple noise is shown in FIG. 6 when using a cosine-squared window for relatively high-frequency data.

This noise is larger for longer sequence lengths and higher frequency components and represents a limitation of this large-window approach.

Note that for this solution to succeed, the time division waveform must be carefully designed such that the frequency components are in phase between subsequent occurrences. In other words, if one were to continue the sub-sequence square wave, it would be in phase with its next occurrence. For square-wave sub-sequences, this condition will be met as long as the time between occurrences is an integer number of periods of the square wave fundamental. If the fundamental is thus in phase, its odd harmonics will also be in phase.

A waveform design criterion that will meet these requirements is to require that each sub-sequence have duration of an integer number of periods at the fundamental frequency. The fundamental frequency is typically, but not always, the lowest frequency sub-sequence in the waveform. More correctly, the fundamental is a frequency where each sub-sequence frequency is an integer multiple of it. If this recommended practice is followed, the duration between occurrences of a given sub-sequence will always be an integer number of fundamental periods for all sub-sequences and the frequency components will be in phase, as required.

This large-window approach removes the need to know the arrival times of the various sub-sequences. It can thus be a good first pass at processing time-division waveforms. Its major drawbacks are the possible ripple noise mentioned above as well as the fact that it does not take advantage of the time localized signal. This latter point means that noise from between the sub-sequences will be included in the recovered frequency component leading to a sub-optimal SNR.

This large-window embodiment of the invention was successfully applied in June of 2009 for the jointly-owned Orphan Basin project in Canada.

Small-Window Approach

Another method for processing time-division data uses smaller windows that are less than or comparable to the sub-sequence length, where "length" refers to time duration. This addresses the limitations of the large-window approach and has the potential to improve the recovered SNR. This potential improvement occurs because the signal is localized within the subsequence window and the smaller window includes less of the competing noises. The ripple noise is also avoided since only one subsequence at a time is captured. This differs from the two subsequences captured in the large-window approach.

The expected boost in SNR by using a smaller window will depend on the window type and size. An estimate of this improvement (compared with a large window) can be obtained as follows. The signal captured can be assumed to be unchanged (between sub-sequence and full sequence windows) since it is localized in the sub-sequence times. The noise, however, is reduced in the smaller window since only the noise within the sub-sequence window is captured—the similar frequency noise at other sub-sequence times is avoided. Using a "stacking law" rule for the noise, it may be assumed that the noise reduction will be approximately the square root of the total sequence length divided by the sub-sequence length.

For the example in FIG. 3, where a subsequence is approximately ⅙ of the total sequence time, the improvement in SNR would be about $\sqrt{6}$. The actual improvement will be somewhat less since a targeted window will typically be less than the full subsequence length in order to avoid transition effects near the start and end of the subsequence.

Figure 7:
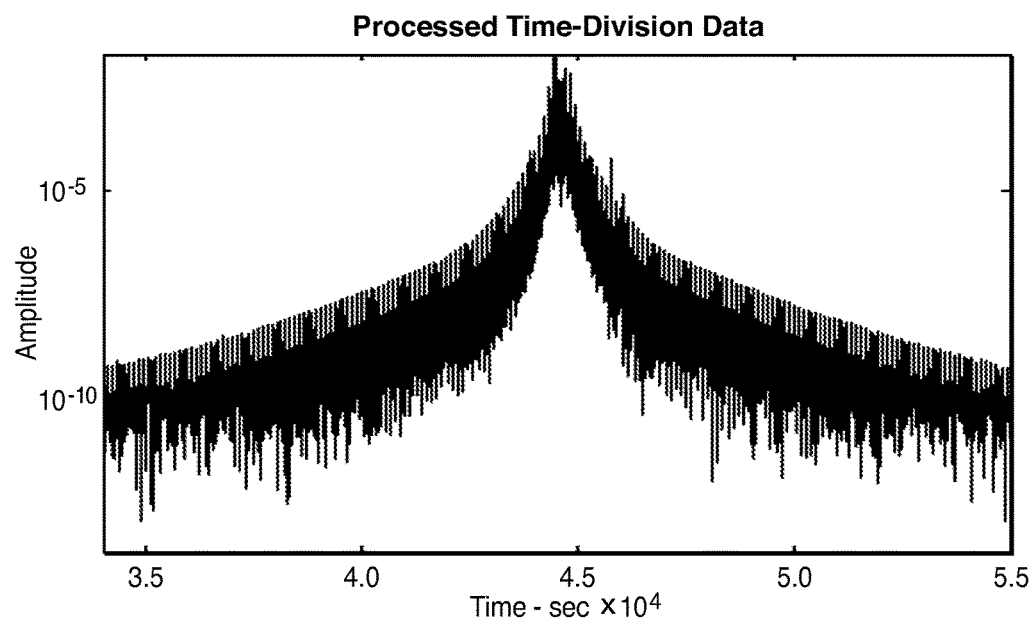
FIG. 7 shows amplitude at 0.25 Hz as determined using overlapping windows and field data collected with the six-subsequence time division waveform shown in FIG. 2.

Overlapping small windows of approximately the sub-sequence length will see the signal of interest at the corresponding signal arrival times and will typically see only low-level noise components between arrivals. This gives a comb-like response as illustrated in FIG. 7. The peak amplitude responses may then be selected or possibly tracked to get the component amplitude and phase values. A blow-up is shown in FIG. 8 to better illustrate the comb-like structure, where the active sub-sequence clearly stands out (the peak amplitudes) from the non-active sub-sequences.

Figure 8:
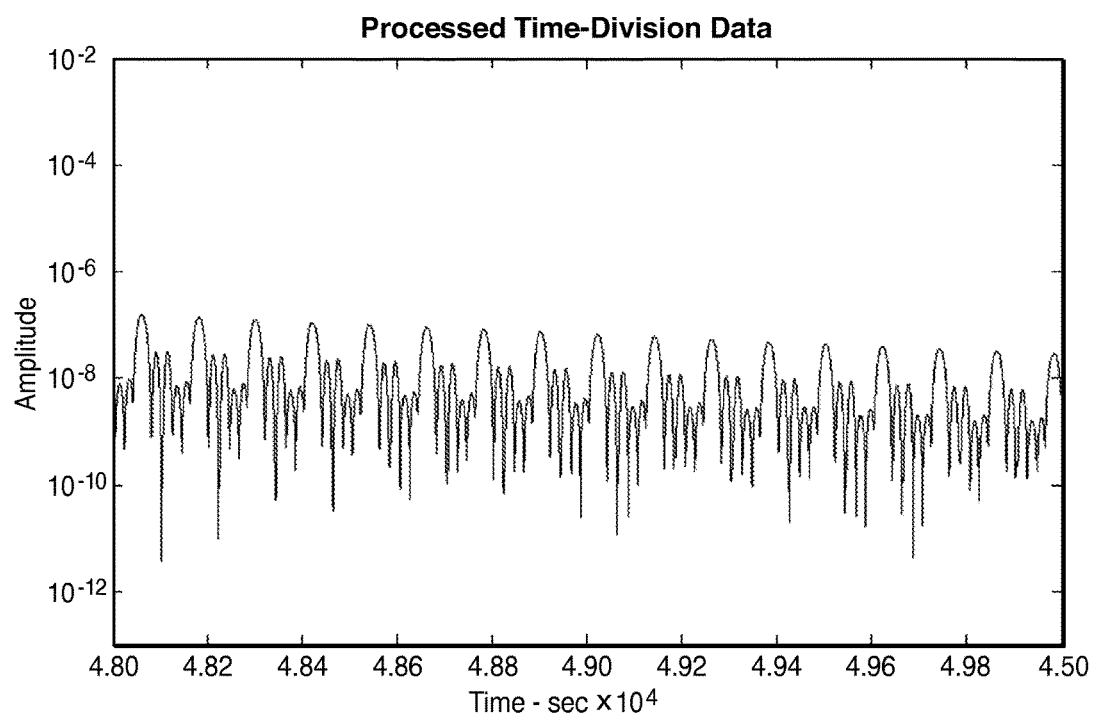
FIG. 8 is a blow-up from FIG. 7 illustrating the comb-like structure where the active subsequence stands out from the non-active subsequences.

FIGS. 7 and 8 can be explained in more detail. Instead of doing a full Fourier transform in each window, which would be quite expensive, these drawings take the results of a 12-second window applied to the signal measured at a receiver, after passing through the subsurface, and correlate them with a corresponding sine and cosine function for each frequency of interest (0.25 Hz in the case of FIGS. 7 and 8) to get the amplitude (and phase) response for those particular frequencies. This is equivalent to a Fourier transform at the selected frequencies. FIGS. 7 and 8 show the results of spectral estimates from many different overlapping 12-second windows. (Since the arrival time of the 0.25 Hz sub-sequence is unknown, the entire sequence is sampled.) The effect of correlating this windowed data with a selected frequency-of-interest sinusoid is that the frequency of interest will dominate over the other non-selected prominent frequencies. The frequencies of other sub-sequences will appear, but at lower amplitudes. This correlation process may be repeated for all the selected frequencies (e.g., the primary and 3rd harmonic for each square-wave subsequence).

Selecting the proper window size and type (e.g., cosine squared) involves a tradeoff of various signal and noise effects. To maximize the signal-to-random noise ratio, one would ideally select a window that roughly matches the subsequence lengths (i.e., getting most of the signal while limiting the noise). At the same time, a somewhat smaller window can be beneficial since it reduces the inclusion of transition transients that occur between subsequences. Avoiding these transition times can also improve signal fidelity since the earth filter will tend to reduce the signal amplitude near the subsequence boundaries.

Additional optional enhancements to this time-division CSEM processing method are listed next. A main idea in options (1) and (2) is to collapse the important information to a smaller time window for subsequent frequency-component estimates. It would avoid other non-signal times and be another way to improve SNR similar to that described in the small-window description. Any of these techniques might be expected to provide comparable benefits and so is a choice for an alternate implementation. The difference between options (1) and (2) is that (1) brings all the signal information to the early times while (2) brings just one frequency component to the early time while other components are intentionally moved to a different later time (out of the way). Option (1) might be preferable when the signals are weak since it will be larger and might stand out better; option (2) might be preferable if the component of interest is large enough since it might reduce distortion from other frequency components.

(1) Correlation of the data with a full-sequence reference to collapse all of the signal prior to estimation of the frequency components (analogous to vibroseis, and is discussed previously above as an alternative to a straightforward Fourier transformation of the windowed data);

(2) Correlation of the data with a specially designed reference for each frequency component that will collapse the desired component while moving other components to some other time;

(3) Tracking the expected arrivals using a tracking algorithm, i.e, an automated way to pick the peaks (e.g., in FIG. 8) when the signal may be dropping below the noise level (A tracking method (e.g., Kalman) might estimate the time delay before the next expected peak—roughly the time of the full sequence but also determining the small adjustments required because of the travel time through the earth.);

(4) Using detection of exponentially varying signal with linear phase delay instead of simple Fourier frequency components (more accurate with larger windows).

(5) Setting sub-sequences such that there are no big jumps in frequency (e.g., harmonics in order 1-3-5-6-4-2-1 . . . with jumps of no larger than twice the fundamental).

Option (4) provides a fix to the ripple distortion from the large-window approach. The distortion occurs because Fourier spectral estimates assume constant sinusoidal amplitude with constant phase. This approximation may be accurate enough in small windows but becomes problematic for larger windows. The suggested approach here is to better model the underlying signal as containing exponential amplitude change (increasing or decaying depending on whether source-receiver offset is respectively decreasing or increasing) with linear phase delay to account for travel time effects. This is a better signal model and could reduce large-window distortion. The cost would be increased computation since the Fourier spectral estimation is replaced with one that has a couple of new parameters that need to be fitted to the data (exponential decay constant and linear phase delay constant).

The problem that option (5) addresses is illustrated in FIG. 3 where the earth filter may have a very different impact on a low-frequency signal compared with a much higher frequency signal. At 5040 seconds in FIG. 3, for example, the lowest-frequency (0.25 Hz) signal arrives just after the highest-frequency (1.50 Hz) signal, and the signal amplitudes are substantially different. The 1.50 Hz signal arriving at about 5030 seconds is barely visible as "fuzz" on a low-frequency "hump-shaped" artifact. The edge effect from a strong, low-frequency arrival (as in this example) can cause problems when detecting a very small adjacent signal. By sequencing the harmonics as suggested here, the frequency differences between adjacent arrivals are minimized, thus minimizing the related edge-effect distortion problems.

The advantages of the small-window embodiment(s) of the invention have been mentioned above. The main advantage of the large-window embodiment is its simplicity. It might be used, for example, as a first pass before the more difficult small-window approach is applied. The key added complexity for the small window is in the peak detection requirement.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

The invention claimed is:

1. A method for controlled-source electromagnetic prospecting comprising:

repeatedly transmitting into a subsurface electromagnetic energy having a time-division source waveform, which is a compound waveform made by combining two or more sub-sequences of base waveforms having different primary or fundamental frequencies, wherein in each sub-sequence, the base waveform for that sub-sequence is repeated a plurality of times, and furthermore wherein in an $i^{th}$ sub-sequence, the base waveform is repeated at a frequency $f_i$, with $f_1$ being the lowest frequency of the $f_i$, and wherein each $f_i$ is an integer multiple of $f_1$ with jumps of no larger than twice $f_1$;

obtaining electromagnetic data resulting from the repeated transmission;

decomposing the data into frequency components using a windowed decomposition method involving one of: (i) Fourier transformation, (ii) a correlation-based equivalent to Fourier transformation, or (iii) isolating a single frequency component by modeling the single frequency component to include (a) exponential amplitude change, increasing or decreasing depending on whether source-receiver offset is, respectively, decreasing or increasing, and (b) linear phase delay, wherein said decomposing is performed using a computer and is designed to deal with not knowing arrival times of particular sub-sequences in the time-division waveform;

imaging, with a computer, the frequency components and generating a data volume of electrical resistivity of earth structures that returned electromagnetic waves to receivers that recorded the electromagnetic data; and prospecting for hydrocarbons at a location derived from the data volume of the electrical resistivity as being indicative of a presence of hydrocarbons.

2. The method of claim 1, wherein the arrival time uncertainty is dealt with by one of:

using a small decomposition window, being a time window with length comparable to the length of a single sub-sequence but less than the length of the entire time-division waveform;

using a larger decomposition window, being a time window having a length and shape that are determined to ensure an equal number of appearances of each sub-sequence within the window.

3. The method of claim 2, wherein the larger window is used, and it is tapered.

4. The method of claim 3, wherein the window is one of a group consisting of a $\cos^2$ window, a rectangular window, and a triangular window.

5. The method of claim 3, wherein the window of the windowed decomposition method is of a length equal to an even integer multiple of the length of the time-division compound waveform.

6. The method of claim 3, wherein the time-division compound waveform is designed such that consecutive occurrences of any particular sub-sequence are in phase with each other.

7. The method of claim 3, wherein each sub-sequence has a time duration that is an integer multiple of the reciprocal of a selected fundamental frequency.

8. The method of claim 2, wherein the decomposition window is applied to the obtained electromagnetic data at a plurality of different times, and each frequency component is obtained from composite data of the different windows.

9. The method of claim 8, wherein the windows applied at different times include overlapping windows.

10. The method of claim 2, wherein the small decomposition window is used, and the small decomposition has a length less than or equal to the length of a sub-sequence representing a particular frequency selected for extraction in the decomposition.

11. The method of claim 10, wherein the window is applied a plurality of times in an overlapping manner, and those with peak amplitude responses are identified and used to obtain amplitude or phase values, or both, for one or more of the frequency components.

12. The method of claim 11, wherein the peak amplitude responses are identified by tracking expected arrivals using a tracking algorithm.

13. The method of claim 10, wherein the window length is less than the sub-sequence length by an amount determined in consideration of reducing inclusion of transition transients that occur between sub-sequences.

14. The method of claim 2, wherein the window is rectangular and not tapered.

15. The method of claim 1, wherein the windowed decomposition method comprises taking a Fourier transform of the obtained electromagnetic data, window-by-window.

16. The method of claim 1, wherein the windowed decomposition method comprises said correlation-based equivalent to Fourier transformation, and the correlation-based equivalent is correlation with a full-sequence sinusoid or other waveform having a fundamental frequency equal to a frequency of interest, and repeating the correlation for each other frequency of interest.

17. The method of claim 1, wherein the windowed decomposition method comprises said correlation-based equivalent to Fourier transformation, and the correlation-based equivalent is correlation with a reference waveform designed to collapse a selected frequency component while moving other frequency components to a different time.

* * * * *